(No Model.)

C. W. HEALD.
DRIVE CHAIN.

No. 310,997. Patented Jan. 20, 1885.

Attest
Carl Spengel
N. D. Ball

Inventor
Charles W Heald
by Herbert D Blakemore Att'y

UNITED STATES PATENT OFFICE.

CHARLES W. HEALD, OF MOLINE, ILLINOIS.

DRIVE-CHAIN.

SPECIFICATION forming part of Letters Patent No. 310,997, dated January 20, 1885.

Application filed May 16, 1884. (No model.)

*To all whom it may concern:*

Be it known that I, CHARLES W. HEALD, of Moline, in the county of Rock Island and State of Illinois, have invented certain new and useful Improvements in Drive-Chains, of which the following is a specification.

My invention relates to that class of chains known as "carrying" or "drive" chains, which, by the engagement of their links with the pins or teeth of a sprocket or gear wheel, are employed for the transmission of power and for other purposes; and it consists in a series of links whose bars have four bearing or working faces and are capable of driving from each or all such faces, one at a time, in a single system of driving-gearing.

It consists, also, in such a construction of links that the friction between them and the pins or teeth of sprocket or gear wheel is spread over a large wearing-surface, and the chain thereby rendered more durable and less liable to become disengaged from such sprocket or gear wheel when in operation.

Figure 1:
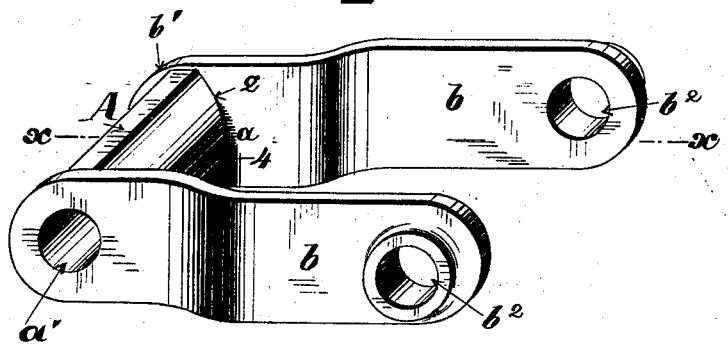
Figure 2:
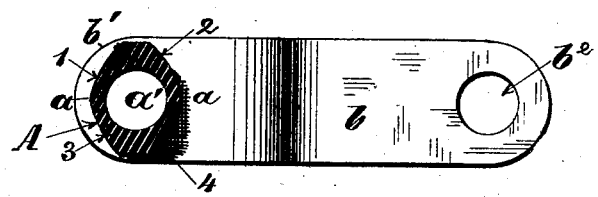
Figure 3:
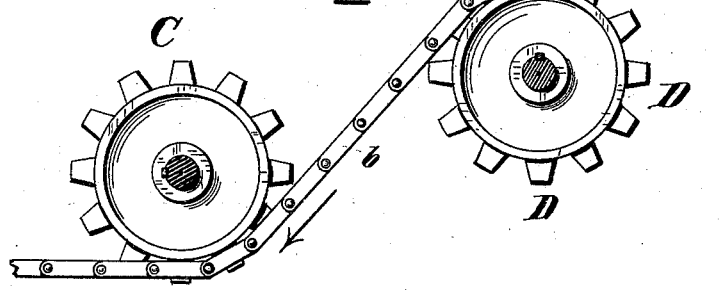

In the drawings, Figure 1 is a perspective view of a link embodying my invention. Fig. 2 is a view in section on the line $x\,x$ in Fig. 1; and Fig. 3 is a system of gearing driven by a chain composed of a series of my links, driving from two of the faces or bearing-surfaces of the link-bars, and when such chain is reversed driving with the opposite two of such faces.

A is the driving-bar of my link, slightly flattened at top and bottom and extending outwardly therefrom with a slight curve to the pitch or medial line $a\,a$ on the center of its sides, forming a gear tooth shape on both top and bottom of the bar, and four bearing or driving faces, 1 2 3 4. To each end of this bar are cast or otherwise attached arms $b\,b$, a little wider than the depth of the bar, and extending a little beyond its rear, thus forming a flange on the rear, top, and bottom of the bar $b'\,b'\,b'$, which takes up part of the friction between the bar and the teeth of the gear or sprocket wheel, and tends to lessen its liability to jump off the pins or teeth of such wheel when in engagement. These arms $b\,b$ extend at right angles to the ends of the bar and parallel for a short way, and then diverge to embrace between their forward ends the bar of the succeeding link. The forward ends of these bars have holes in them, $b^2\,b^2$, through which a rivet passes, as well as through a central hole, $a'$, in the bar, which is embraced between them, to hold the links in engagement one with another, while allowing flexion of the links in passing over the pins or teeth of the sprocket or gear wheel.

My chain can be used with a sprocket-wheel such as is commonly employed with chains of the same general shape; but from the gear-tooth construction of the link-bar I have found it most effective when used in connection with wheels or gearing having teeth or depressions between them corresponding with the shape of such bar, and consequently prefer a special form of gear-wheel.

The shape of my bar, as above described, unlike those heretofore used, has a gear-tooth form on both top and bottom, and four bearing-sides, 1 2 3 4. These bearings are of such a shape that when engaging with and moving over the teeth of a gear-wheel they touch the teeth at every point in their surface, and the entire bearing-surface of that face of the bar opposed to the gear-teeth is utilized, thus not only making the driving action of the chain more effective, but distributing the friction and consequent wear, which a cylindrical bearing touching the gear-tooth at a single point only would cause, and, being slightly tapering toward the top and bottom, they slide readily off the teeth or pins of the gears when their driving action is completed and they are ready to come out of engagement therewith.

The link-bar having four similarly-shaped bearing surfaces or faces, a chain composed of a series of my links can be used in a system of drive-gearing involving changes in the application of the chain, or changes in the direction of rotation of the various wheels constituting the system, requiring the use of all the bearing faces or surfaces of the links, and at the same time permit the rotation of the entire system of gearing to be reversed without destroying the effectiveness of the chain. This is illustrated to a limited extent in Fig. 3. When the gears are rotating in the direction of the arrow, bearing-surfaces 1 and 3 of the bar of each link will engage with the teeth of the wheels C and D, respectively, and the gearing may be reversed without affecting the working of the chain. If, on the other hand, the chain is reversed or inverted, the bearing-surfaces 2 and 4 will engage with the teeth of the respective wheels, and reversing the gearing will not affect the result.

I claim—

1. A drive-chain link provided with a driving-bar having four bearing or working faces, two above and two below the longitudinal axis of the cross-bar, one upper and one lower face being on the forward side and the other upper and lower face being on the rear side of the bar, substantially as and for the purpose set forth.

2. A drive-chain link consisting of a driving-bar, A, provided with working or bearing faces 1 2 3 4, with arms $b\,b$ extending forward from said bar, substantially as shown and described.

3. The herein-described drive-chain composed of a series of links, each consisting of driving-bar A, having working or bearing faces 1 2 3 4, and arms $b\,b$, connected by rivets or bolts, substantially as described.

CHARLES W. HEALD.

Witnesses:
C. STEWART EILLS,
W. T. BALL.